May 5, 1959
R. C. BAKER
2,885,009
COLD FLOW PREVENTING PACKING STRUCTURES
Filed Jan. 23, 1956
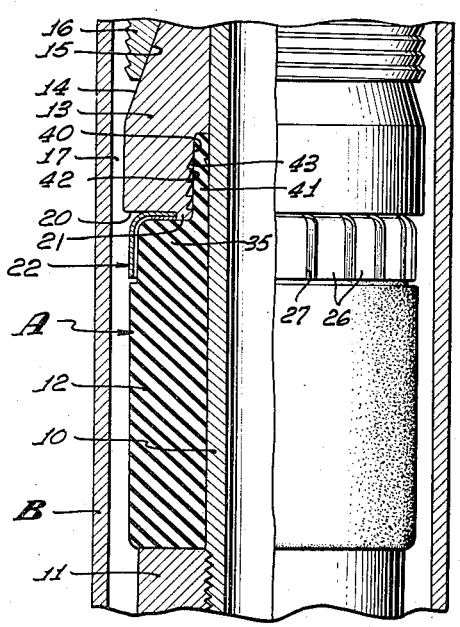
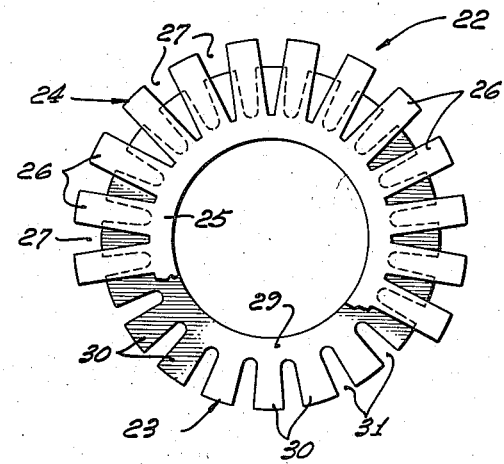
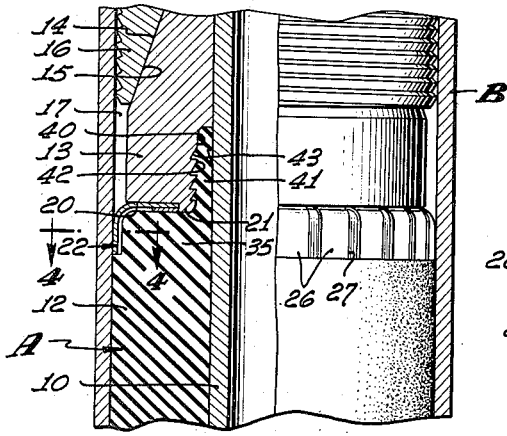
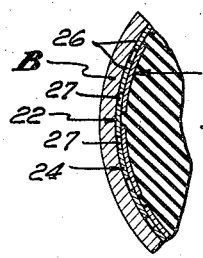
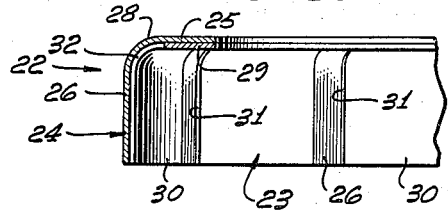
INVENTOR.
REUBEN C. BAKER
BY
Mellin and Hanscom
ATTORNEYS.

United States Patent Office 2,885,009
Patented May 5, 1959

2,885,009

COLD FLOW PREVENTING PACKING STRUCTURES

Reuben C. Baker, Coalinga, Calif., assignor to Baker Oil Tools, Inc., Los Angeles, Calif., a corporation of California Application January 23, 1956, Serial No. 560,693

6 Claims. (Cl. 166—204)

The present inventon relates to subsurface well tools, and more particularly to packing devices adapted to be disposed in well bores for effecting seals against casing, liners, and the like, disposed therewithin.

Packing elements disposed in well bores are usually made of rubber or rubber-like materials, or similar pliant, elastic material. The packing element ordinarily bears against an abutment that has a substantial clearance with the wall of a surrounding well casing, liner, or the like. When the packing element is subjected to substantial forces, it tends to cold flow into the clearing space around the adjacent abutment. Such cold flowing action is most pronounced in well bores having relatively high temperatures and pressures. In fact, in some instances, it is so pronounced that a large portion, and possibly substantially all, of the packing material might be forced into the clearance space, causing the packing element to fail.

Accordingly it is an object of the invention to provide an improved packing structure embodying a pliant, elastic packing element that is prevented from cold flowing into the clearance space around an adjacent abutment, despite the subjecting of the packing element to high pressures or temperatures, or combinations thereof.

Another object of the invention is to provide an improved mode of securing a pliant, elastic packing element to an adjacent abutment.

This invention possesses many other advantages, and has other object which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a combined side elevational view and longitudinal section through a portion of an apparatus embodying the invention, with the packing element disposed in an initial, retracted position;

Fig. 2 is a view similar to Fig. 1, disclosing the packing element expanded into sealing engagement with the walls of the surrounding well casing;

Fig. 3 is a plan view of a retainer structure for preventing cold flowing of the packing element in an intermediate stage of its manufacture;

Fig. 4 is a fragmentary cross-section taken along the line 4—4 on Fig. 2;

Fig. 5 is a longitudinal section through a portion of the packing element retainer device after it has been formed into the desired shape.

The invention is illustrated in the drawings as embodied in a well packer A adapted to effect a seal with the wall of a well casing B in which the apparatus is disposed. The well packer includes a central tubular body 10 suitably connected to a running-in string (not shown), by means of which the well packer is lowered in the well casing to the location at which it is to be sealed off thereagainst. The lower portion of the body 10 may have a lower abutment 11 threadedly, or otherwise firmly, secured thereto. Above such lower abutment is a packing element or sleeve 12 surrounding the body made of rubber or rubber-like material, or some other suitable pliant and elastic material. The upper end of the packing element is disposed adjacent an upper abutment 13 which may be in the form of an expander slidably mounted on the body 10 of the tool, and having an upward and inwardly tapering external surface 14 engaging companion internal tapered surfaces 15 on a plurality of segmental slips 16 surrounding the expander.

Initially, the slips 16 are in a retracted position spaced inwardly away from the wall of the well casing B. Similarly, the packing element or sleeve 12 is disposed initially in a retracted position, having a substantial clearance with the wall of the well casing. In order to facilitate lowering of the well packer in the well casing, the periphery of the upper abutment or expander 13 is also spaced from the wall of the well casing, there being a substantial annular clearance space 17 therebetween.

After the apparatus A has been lowered to the desired location in the well casing B, the running-in string (not shown) and the body 10 of the tool may be moved in an upward direction to cause the upper abutment or expander 13 to expand the slips 16 outwardly into anchoring engagement with the wall of the well casing B, all in a known manner. Expansion of the slips 16 into anchoring engagement with the wall of the well casing prevents further upward movement of the upper abutment or expander 13. Thereafter, a continuation of the upward movement of the body 10 will move the lower abutment 11 toward the upper abutment 13, foreshortening and compressing the packing sleeve 12 surrounding the body, and causing it to be expanded laterally outward into firm sealing engagement with the wall of the well casing.

Assuming that the packing element is subjected to high pressures and high temperatures in the well bore below the apparatus, such adverse factors tend to cause the pliant, elastic packing material 12 to move upwardly into the clearance space 17 between the upper abutment 13 and the wall of the well casing B. Conditions have been known in which substantially all of the packing material has been forced through the clearance space between the abutment and the well casing, leaving very little, if any, packing material available for performing a sealing function against the wall of the well casing B, as well as against the periphery of the packer body 10, with resultant failure of the apparatus. The present invention prevents such cold flowing of the rubber packing 12 through the clearance space 17 between the abutment 13 and the wall of the surrounding well casing B.

The lower portion of the upper abutment 13 is formed with a transverse shoulder 20 that ends inwardly at a depending, relatively short boss 21. The upper end portion of the packing sleeve 12 engages the lower end of the boss 21, which is actually provided for the purpose of appropriately centering a packing flow preventing device or retainer structure 22, which normally occupies a retracted position, but is adapted to be expanded outwardly by the packing element 12 itself into engagement with the wall of the well casing B, and bridge the annular clearance space 17 between the upper abutment 13 and the casing B.

As disclosed in the drawings, the packing flow preventing device 22 includes an inner cup-shaped flexible member 23, made of sheet metal, having proper physical characteristics, which is received within an outer cup-shaped flexible member 24 that is also made of sheet metal having appropriate physical characteristics. The outer member 24 has a base 25 bearing against the transverse shoulder 20 of the abutment, this base having an inside diameter substantially equal to the outside diameter of the boss 21. The outer member 24 has a depending skirt consisting of a plurality of circumferentially spaced and longitudinally extending flat fingers 26 separated by slots 27, the lower ends of the fingers 26 being free and the upper portions 28 of the fingers being curved and merging into the base 25 of the outer member. As specifically disclosed, the depending portions of the fingers 26 are substantially parallel to axis of the apparatus.

The inner cup-shaped member 23 is formed in a manner similar to the outer cup-shaped member. It includes an upper base 29 bearing against the base 25 of the outer member 24, the base 29 having an inside diameter substantially equal to the outside diameter of the boss 21. The inner cup-shaped member also has a depending skirt portion consisting of a plurality of circumferentially spaced flat fingers 30 separated by slots or spaces 31 in the skirt portion, the upper portions 32 of the fingers being curved and merging into the base 29. The fingers 30 of the inner member 23 may be equal in number to the fingers 26 of the outer member, the base and finger portions 29, 30 of the inner member engaging the inner surfaces of the base and finger portions 25, 26 of the outer member, with the inner member fingers 30 staggered with respect to the outer member fingers 26, such that the fingers of one member 26 or 30 extend over the slots or spaces 31 or 27 between the fingers of the other member.

The slots or spaces 27 of the fingers 26 of the outer member terminate at the base portion 25, where such base portion engages the transverse shoulder 20 of the abutment. The slots or spaces 31 of the inner member also terminate at its base portion 29 where the outer part of the latter engages the outer member base 25.

The upper portion 35 of the packing element or sleeve 12 is of smaller outside diameter than the diameter of the packing sleeve therebelow, to receive the staggered fingers 30, 26 of the inner and outer members, in order that the outer member 24 will have substantially the same diameter as the main portion of the packing element or sleeve. The upper portion 35 of the packing element engages the base 29 of the inner member 23, with its upper peripheral portion engaging both the straight and curved parts of the inner member fingers 30.

The inner and outer cup-shaped members 23, 24 are made of flexible sheet material that is relatively soft, so as to be capable of bending, without breaking, under the forces encountered in a well bore. The cup-shaped members may each be formed from flat sheet material, the outer member being first made as a flat annulus (Fig. 3), with its outer portions provided with slots 27 to the appropriate depth, leaving the inner portion circumferentially uninterrupted to provide the base 25 of the member, whereupon the fingers 26 are then bent into the shape disclosed in Figs. 1 and 5, in which the lower portions of the fingers 26 are substantially parallel to the axis of the members and the intermediate portions 28 effect a smooth curve between the base 25 and the longitudinally extending finger portions.

The inner member 23 is formed in a manner similarly to the outer member, except that when in the flat annulus form (Fig. 3) its fingers are shorter in view of the shorter radius of the intermediate curved portions 32 and the fact that the inner member 23 rests within the outer member 24. The decreased length of the fingers 30 is necessary to cause the free ends of the inner fingers 30 to terminate at the same point as the free ends of the outer fingers 26 when the inner member is nested within the outer member (Figs. 1 and 5).

As stated above, the sheet metal of which the inner and outer members are composed is flexible and soft. As an example, the inner and outer members may be made of an annealed aluminum alloy designated by aluminum manufacturers as 3S-O. Such aluminum alloy is not brittle, and will not break when subjected to a plurality of bending actions. However, the thickness of the material will not vary under extremely high pressure and temperature loads to which it may be subjected when in the well bore. It is found that such a material can be formed into the cup-shapes disclosed in the drawings, and can act effectively to bridge the clearance space 17 between the abutment and the casing wall, when the packing element 12 is expanded outwardly.

During the running of the apparatus A in the well casing B, the parts occupy the retracted positions disclosed in Fig. 1. The overlapping fingers 30, 26 of the inner and outer cup-shaped members 23, 24 are disposed in the inwardly retracted positions shown, in which the peripheries of the outer fingers or skirt 26 do not extend beyond the periphery of the upper abutment 13. When the tool is to be set against the well casing, an upward strain is taken on the body 10, as described above, to expand the slips 16 against the well casing, and to foreshorten the packing element 12 and also expand it against the well casing. During its compression and outward expansion, the end portion 35 of the packing forces the overlapping fingers 30, 26 in an upward and outward direction, the curved portions 32, 28 of the fingers bending against the transverse abutment shoulder 20 and becoming straightened and flattened against the shoulder 20 (Fig. 2), the fingers 30, 26 being expanded by the packing 12 until the lower, or free portions, of the outer fingers 26 are brought into engagement with the wall of the well casing, the inner fingers 30 being maintained in engagement with the outer fingers 26 and overlapping the slots 27 between the latter. Between the periphery of the abutment 13 and the point where the outer fingers 26 engage the casing B, the fingers may be bent or curved into the forms disclosed in Fig. 2 and in broken lines in Fig. 5.

The flexible fingers 30 of the inner member 23 overlap the spaces 27 between the fingers 26 of the outer member 24, and the fingers 26 of the outer member overlap the spaces 31 between the fingers of the inner member, the sets of fingers 26, 30 coacting with each other to bridge the annular clearance space 17 between the abutment 13 and the wall of the well casing B, allowing no gaps or spaces to exist between the inner and outer members 23, 24 through which the rubber, or similar pliant, elastic packing material, can flow or be forced. The inner and outer members 23, 24 have a high strength and will not fail, despite being subjected, through the intermediary of the packing element 12, to exceedingly high pressure and high temperature conditions. The outer fingers 26 firmly engage the transverse shoulder 20 of the abutment 13, the inner portions of the inner fingers 30 also firmly engaging such flattened outer fingers, so that the rubber flow preventing structure is in flat contact with the transverse abutment shoulder 20 up to the periphery of the abutment 13 where the intermediate portions of the fingers 26, 30 will have been curved or bent into the form disclosed in Fig. 2. Such curved portions merge into the longitudinally extended free finger portions, with the outer fingers 26 bearing against the walls of the well casing (as in Fig. 2).

There will be slight spaces between the outer fingers 26 where they engage the wall of the well casing, but such spaces are comparatively small, considering their relatively short width, and the relatively small thickness of the sheet metal material, and do not afford a passage into which the rubber packing material will squeeze to any appreciable extent.

To prevent any tendency of the inner end portion 35 of the packing element from moving away or separating from the abutment 13, an anchoring device is provided between the abutment and the end portion of the packing element which permits the parts to be assembled very easily, but which still insures their firm attachment to one another following expansion of the packing element 12 into sealing engagement with the wall of the well casing B. It is to be noted that the abutment 13 is provided with a counterbore 40 forming an annular space with the periphery of the body 10. A generally cylindrical extension 41 of the packing element is disposed in this space. The inner wall of the counterbore is provided with longitudinally spaced circumferential teeth 42 facing in an upward direction. These teeth may be formed as buttress threads, there being longitudinally spaced internal grooves 43 therebetween. When the packing element 12 is foreshortened and expanded in an outward direction, the packing material is forced upwardly into the counterbore 40, and will be forced into the longitudinally spaced grooves 43, producing a firm and secure anchoring between the packing extension 41 and the abutment 13. Any tendency for the abutment 13 and packing 12 to separate will be resisted by the teeth 42 on the abutment engaging the rubber packing material forced into the circumferential grooves 43 therebetween.

A firm anchor between the abutment 13 and the packing sleeve 12 has been provided, in which it is unnecessary to secure the anchoring between the two until the packing element 12 is to be expanded against the well casing B. Accordingly, it is a simple matter to merely slide the extension 41 of the packing element into the counterbore 42, the parts becoming anchored to one another automatically as a result of the expansive force that is imposed on the packing element 12.

The inventor claims:

1. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and a generally cylindrical skirt portion encompassing and extending along the generally cylindrical periphery of said packing member, an outer cup-shaped member having a base portion engaging said other base portion and said transverse shoulder and a skirt portion disposed over and along the periphery of the other skirt portion, each of said skirt portions comprising circumferentially spaced fingers, the fingers of one skirt portion being in staggered relation to the fingers of the other skirt portion so as to bridge the spaces therebetween, said cup-shaped members being made of flexible metal to enable said packing member to expand said fingers against and toward said transverse shoulder and outwardly against and toward the companion wall to lie lengthwise thereof in generally cylindrical fashion upon expansion of said packing member.

2. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and a generally cylindrical skirt portion encompassing and extending along the general circumferential periphery of said packing member, an outer cup-shaped member having a base portion engaging said other base portion and said transverse shoulder and a skirt portion disposed over and along the periphery of the other skirt portion, each of said skirt portions comprising circumferentially spaced fingers, the fingers of one skirt portion being in staggered relation to the fingers of the other skirt portion so as to bridge the spaces therebetween, said cup-shaped members being made of sheet metal to enable said packing member to deflect said fingers against and toward said transverse shoulder and outwardly against and toward the companion wall to lie lengthwise thereof in generally cylindrical fashion upon expansion of said packing member.

3. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and a generally cylindrical skirt portion encompassing and extending along the generally cylindrical periphery of said packing member, an outer cup-shaped member having a base portion engaging said other base portion and said transverse shoulder and a skirt portion disposed over and along the periphery of the other skirt portion, each of said skirt portions comprising circumferentially spaced fingers integral with the base portion, the fingers of one skirt portion being in staggered relation to the fingers of the other portion so as to bridge the spaces therebetween, said cup-shaped members being made of flexible sheet metal to enable said packing member to press said fingers against and toward said transverse shoulder and expand and deflect said fingers outwardly against and toward the companion wall to lie lengthwise thereof in generally cylindrical fashion upon expansion of said packing member.

4. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and a generally cylindrical skirt portion encompassing and extending along the generally cylindrical periphery of said packing member, an outer cup-shaped member having a base portion engaging said other base portion and said transverse shoulder and a skirt portion disposed over and along the periphery of the other skirt portion, each of said skirt portions comprising circumferentially spaced fingers integral with the base portion, the fingers of one skirt portion being in staggered relation to the fingers of the other portions so as to bridge the spaces therebetween, said cup-shaped members being made of soft, annealed aluminum alloy sheet material to enable said packing member to press said fingers against and toward said transverse shoulder and expand and deflect said fingers outwardly against and toward the companion wall to lie lengthwise thereof in generally cylindrical fashion upon expansion of said packing member.

5. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and circumferentially spaced fingers, said fingers comprising generally cylindrically arranged outer portions extending longitudinally along the generally cylindrical periphery of said packing member and curved inner portions integral with and merging into said outer portions and base portion, an outer cup-shaped member having a base portion engaging said other base portion and said transverse shoulder and also circumferentially spaced fingers, said last-mentioned fingers comprising generally cylindrically arranged outer portions extending longitudinally along the outer portions of the said other fingers and curved inner portions integral with and merging into said outer portions and base portion of said outer cup-shaped member, the fingers of one cup-shaped member being in staggered relation to the fingers of the other cup-shaped members so as to bridge the spaces therebetween, said cup-shaped members being made of flexible material to enable said packing member to expand said fingers against and toward said transverse shoulder and outwardly toward and against the companion wall to lie lengthwise thereof in a generally cylindrical fashion upon expansion of said packing member.

6. A packing structure, including a non-metallic packing member adapted to engage a companion wall, said member having a transverse surface and a generally cylindrical periphery, an abutment adjacent said member and having a transverse shoulder opposite said transverse surface, an inner cup-shaped member having a base portion engaging said transverse surface and circumferentially spaced fingers, said fingers comprising generally cylindrically arranged outer portions extending longitudinally along the generally cylindrical periphery of said packing member and curved inner portions integral with and merging into said outer portions and base portion, an outer cup-shaped member having a base portion engaging said other base portion and said transverse shoulder and also circumferentially spaced fingers, said last-mentioned fingers comprising generally cylindrically arranged outer portions extending longitudinally along the outer portions of the said other fingers and curved inner portions integral with and merging into said outer portions and base portion of said outer cup-shaped member, the fingers of one cup-shaped member being in staggered relation to the fingers of the other cup-shaped member so as to bridge the spaces therebetween, said cup-shaped members being made of soft, annealed aluminum alloy sheet material, to enable said packing member to expand said fingers against and toward said transverse shoulder and outwardly against and toward the companion wall to lie lengthwise thereof in generally cylindrical fashion upon expansion of said packing member.

References Cited in the file of this patent
UNITED STATES PATENTS

| | | |
|---|---|---|
| 2,171,049 | Simmons | Aug. 29, 1939 |
| 2,217,043 | Boynton | Oct. 8, 1940 |
| 2,229,635 | Boynton | Jan. 28, 1941 |
| 2,343,075 | Otis | Feb. 29, 1944 |
| 2,734,582 | Bagnell | Feb. 14, 1956 |
| 2,738,013 | Lynes | Mar. 13, 1956 |